United States Patent
Ushioda et al.

(10) Patent No.: US 6,710,196 B2
(45) Date of Patent: Mar. 23, 2004

(54) COLD-RESISTANT FAT COMPOSITION AND PROCESS FOR PRODUCING THE SAME

(75) Inventors: Toshio Ushioda, Tsukuba-gun (JP); Haruyasu Kida, Tsukuba-gun (JP)

(73) Assignee: Fuji Oil Company, Osaka (JP)

( * ) Notice: Subject to any disclaimer, the term of this patent is extended or adjusted under 35 U.S.C. 154(b) by 0 days.

(21) Appl. No.: 10/332,128

(22) PCT Filed: Jun. 28, 2001

(86) PCT No.: PCT/JP01/05605
§ 371 (c)(1),
(2), (4) Date: Jan. 6, 2003

(87) PCT Pub. No.: WO02/04581
PCT Pub. Date: Jan. 17, 2002

(65) Prior Publication Data
US 2003/0180433 A1 Sep. 25, 2003

(30) Foreign Application Priority Data
Jul. 6, 2000 (JP) .......................................... 2000-205350

(51) Int. Cl.⁷ ................................................. C07C 57/00
(52) U.S. Cl. ........................ 554/227; 554/223; 554/224
(58) Field of Search ................................ 554/223, 224, 554/227

(56) References Cited

U.S. PATENT DOCUMENTS 4,861,612 A 8/1989 Nakano et al.

FOREIGN PATENT DOCUMENTS

| JP | 4-173053 | 6/1992 |
| JP | 5-39497 | 2/1993 |
| JP | 5-209187 | 8/1993 |
| JP | 5-255692 | 10/1993 |
| JP | 7-179882 | 7/1995 |
| JP | 8-239684 | 9/1996 |
| JP | 8-332093 | 12/1996 |
| JP | 9-165595 | 6/1997 |
| JP | 9-241673 | 9/1997 |
| JP | 9-310088 | 12/1997 |
| JP | 11-166192 | 6/1999 |
| JP | 2001-8619 | 1/2001 |

OTHER PUBLICATIONS

Abstr. of JP–7/179882, 1995.*

\* cited by examiner

Primary Examiner—Deborah Carr
(74) Attorney, Agent, or Firm—Wenderoth, Lind & Ponack, L.L.P.

(57) ABSTRACT

The objects of the present invention are to provide a fat composition which even in long-term storage at low temperature (in a refrigeration or freezing range), has excellent cold resistance because the fat is inhibited from undergoing crystal growth, and to provide a process for producing the composition. The present inventors made intensive studies in order to accomplish the object and, as a result, they have found that a cold-resistant fat composition comprising 0.15 to 4.5% by weight of tri-saturated fatty acid glycerides based on a fat which is in a liquid state at room temperature and has 60% or more of the proportion of polyunsaturated fatty acids in all the unsaturated fatty acids therein, a process for producing the same, and an oil-based food comprising as a main component of its fat component(s) the cold-resistant fat composition can be provided.

3 Claims, No Drawings

COLD-RESISTANT FAT COMPOSITION AND PROCESS FOR PRODUCING THE SAME

This application is a 371 of PCT/JP01/05605 filed Jun. 28, 2001.

TECHNICAL FIELD

The present invention relates to a fat composition of excellent cold-resistance by inhibiting crystal growth of the fat even for long-term storage at a low temperature (in a refrigeration or freezing temperature range).

BACKGROUND ART

Some fats, even if they are in a liquid state at room temperature, come to lose fluidity at low temperatures in the refrigeration or freezing temperature range of 0° C. to −20° C. and then solidify. However, of vegetable oils, special vegetable oils such as evening primrose seed oil, kukuinut seed oil and tobacco seed oil do not solidify even at −20° C. However, the amounts of supply thereof are few and the prices are also expensive, and thus they are not utilized in large quantities. Castor oil, rapeseed oil, macadamia oil, etc. are liquid at room temperature, the amounts of supply thereof are not few, and the prices are not expensive, and so they seem to be used in high volume. However, they come to lack fluidity in the freezing temperature range of −20° C. and solidify.

Conventionally, as techniques for solving the problem of these vegetable oils solidifying at low temperatures, JP 5-209187 A proposes a cold-resistant vegetable oil obtained by adding to a vegetable oil three components of a polyglycerol fatty ester, a sucrose fatty ester and lecithin. JP 8-239684 A proposes a cold resistance improved fat composition prepared by adding a vegetable oil having a solid fat content at a temperature of 10° C. of 10% or less to a specific amount of a sucrose fatty ester having a HLB of 3 or less. JP 9-310088 A proposes an anti-crystallization agent for edible liquid fats comprising a mixture of a polyglycerol fatty acid and a sorbitan fatty ester. However, these technologies are still unsatisfactory.

DISCLOSURE OF THE INVENTION

The objects of the present invention are to provide a fat composition of excellent cold-resistance by inhibiting crystal growth of the fat even in long-term storage at a low temperature (in a refrigeration or freezing temperature range) and also to provide a process of producing the fat composition.

The present inventors have studies intensively in order to solve the above problem and, as a result, they have found that it is possible to provide a cold-resistant fat composition comprising 0.15 to 4.5% by weight of tri-saturated fatty acid glycerides based on a fat which is in a liquid state at room temperature and has 60% or more of the proportion of polyunsaturated fatty acids in all the unsaturated fatty acids therein, as well as a process for producing thereof and an oil-based food comprising as a main component of its fat component(s) the cold-resistant fat composition.

BEST MODE FOR CARRYING OUT THE INVENTION

As the fat used in the present invention, a liquid fat at room temperature is preferred. Raw materials thereof include, for example, vegetable fats such as rapeseed oil, soybean oil, sunflower seed oil, cottonseed oil, peanut oil, rice bran oil, corn oil, safflower oil, olive oil, kapok oil, sesame oil, evening primrose oil, palm oil, and palm kernel oil, as well as processed fats thereof prepared by subjecting these fats to hydrogenation, fractionation, interesterification, etc.

Fats are composed of fatty acids and glycerin and, of constituent fatty acids of fats, those whose carbon-carbon links are only single bonds are referred to as saturated fatty acids, and examples thereof include caprylic acid, n-capric acid, lauric acid, myristic acid, palmitic acid, stearic acid, arachic acid, behenic acid, lignoceric acid and the like. Further, of fatty acids, those having one or more double bonds in carbon-carbon links are referred to as unsaturated fatty acids and examples thereof include oleic acid, linoleic acid and linolenic acid. Of unsaturated fatty acids, those having two or more double bonds are particularly referred to as polyunsaturated fatty acids.

In the present invention, it is required to use a fat which is liquid at room temperature of 15° C. to 25° C. and whose proportion of polyunsaturated fatty acids to all the unsaturated fatty acids is 60% or more. Fats whose proportion of polyunsaturated fatty acids to all the unsaturated fatty acids is less than 60% are completely solidified when they are allowed to stand at −20° C. for 24 hours. Then, in case of these fats, fats are completely solidified because the amount of fat crystals is too large during storage in a freezing temperature range.

The tri-saturated fatty acid glycerides used in the present invention are triglycerides all whose constituent fatty acids are saturated fatty acids. Preferred saturated fatty acids include myristic acid, palmitic acid, stearic acid, arachic acid, behenic acid, and lignoceric acid. Examples thereof include those of extremely hydrogenated oil of high erucic acid rapeseed oil, extremely hydrogenated oil of palm oil, extremely hydrogenated oil of rice bran oil and the like. The method for addition of the tri-saturated fatty acid triglycerides to the fat in the present invention is not specifically limited. The amount to be added is 0.15 to 4.5% by weight, preferably 0.3 to 3.0% by weight. When the amount to be added is below the lower limit, the effect is recognized to some extent, but insufficient. When the amount exceeds the upper limit, the effect is recognized, but insufficient and meltability in the mouth becomes bad. As long as the above formulation ratio is met, other emulsifier(s) for foods (e.g. polyglycerol fatty acid ester, sucrose fatty acid ester, lecithin, etc.) may be used in combination.

The cold-resistant fat of the present invention can be used as a coating fat for frozen foods, a mold lubricant, an oil-based sauce, and oil-based foods such as a dressing to be used at a low temperature. The fat can also be used as a lubricant oil for machinery utilized in other different fields. For example, a method for producing a fat for coating and a mold lubricant can be carried out by incorporating tri-saturated fatty acid glycerides into a fat which is in a liquid state at room temperature and has 60% or more of the proportion of polyunsaturated fatty acids in all the unsaturated fatty acids therein in an amount of 0.15 to 4.5% by weight based on the fat, mixing and melting the resultant mixture and cooling the mixture to obtain the desired product. In addition, a method for producing an oil-based sauce can be carried out by mixing and melting the above cold-resistant fat composition, saccharides, a solid flavor material and an emulsifier, and then cooling the resultant mixture to obtain the desired product. Examples of saccharides include sucrose, maltose, glucose, powdered wheat gluten, fructose, lactose, trehalose, powdered maltose, etc. Examples of solid flavor materials include dairy products such as a whole milk powder, a skim milk powder, a cream powder, a whey powder, a butter milk powder, etc., cacao components such as cocoa powder, an adjusted cocoa powder, etc., a cheese powder, a coffee powder, a fruit juice powder, etc. By using the cold-resistant fat component of the present invention as a main component of a fat component of these oil-based foods, the crystal growth of the fat is inhibited even at long-term storage at a low temperature (in a refrigeration or freezing temperature range), thereby maintaining the fluidity of these oil-based foods.

EXAMPLES

The present invention will be illustrated in more detail by means of the following examples, but the spirit of the present invention is by no means limited thereto. All the percents and parts in the examples are by weight.

In the following examples, the measurement of the hardness of fats and the determination of the fatty acid compositions of fats were carried out as follows.

(Method for Measuring Hardness of Fats)

Into a container was placed 40 g of a fat and the container was allowed to stand in a refrigerator at −20° C. The hardness of the fat was determined over time by means of a rheometer (manufactured by Fudo Kogyo Co. Ltd.; measurement limit: 2,000 g/cm$^2$, measurement conditions: plunger diameter 10 mm, speed 5 cm/min). The result means that the smaller the measurement value of the rheometer, the more excellent the cold resistance.

(Method for Determining Fatty Acid Compositions of Fats)

According to a conventional manner, a fat was subjected to methyl interesterification and was analyzed by gas chromatography. The composition and proportion of components were calculated by area ratios in an analysis chart. On the basis of the results, the proportion of polyunsaturated fatty acids to all unsaturated fatty acids was calculated.

Experimental Example 1

Into a container was placed 40 g of each fat shown in Table 1, the container was allowed to stand in a refrigerator at −20° C. for a week and then the hardness and the fatty acid composition were determined. The results are summarized in Table 1. As a result, a vegetable oil in which the proportion of the polyunsaturated fatty acids to all the unsaturated fatty acids is 60% or more was measurable using a rheometer even after it was kept at −20° C. for one week.

TABLE 1

| Fat | 1 week | Polyunsaturated fatty acids/unsaturated fatty acids |
|---|---|---|
| High oleic sunflower oil | 2000 or more | 11% |
| High oleic safflower oil | 2000 or more | 13% |
| Rapeseed oil | 2000 or more | 37% |
| Rice oil | 2000 or more | 50% |
| Sesame oil | 2000 or more | 51% |
| Corn oil | 2000 or more | 59% |
| Soybean oil | 1000 | 72% |
| Regular sunflower oil | 120 | 78% |

TABLE 1-continued

| Fat | 1 week | Polyunsaturated fatty acids/unsaturated fatty acids |
|---|---|---|
| Regular safflower oil | 300 | 86% |

Example 1

A fat composition was obtained by incorporating, as tri-saturated fatty acid glyceride, extremely hydrogenated high erucic acid rapeseed oil containing behenic acid (iodine value below 1, melting point 62° C.) into a regular sunflower oil, whose proportion of the polyunsaturated fatty acids to all the unsaturated fatty acids was 78%, in the amount of 0.2%, melting the resultant mixture at 65° C. and cooling the mixture. This fat composition was allowed to stand in a refrigerator at −20° C. and the hardness of the fat composition was measured over time by means of a rheometer. After one-day storage, the hardness via the rheometer was 22 g/cm$^2$ and the evaluation was excellent (◎). After one-week storage, the hardness was 60 g/cm$^2$ and the evaluation was good (○). After three-week storage, the hardness was 90 g/cm$^2$ and the evaluation was good (○). Thus, it was confirmed that the cold resistance of the composition was improved by blending 0.2% of the extremely hydrogenated oil of high erucic acid rapeseed oil.

Example 2

According to the same manner as that in Example 1, a fat composition was obtained except that the amount of the extremely hydrogenated oil of high erucic acid rapeseed oil to be incorporated into the regular sunflower oil was changed from 0.2% to 0.3%, followed by allowing the composition to stand in a refrigerator at −20° C. and measuring the hardness of the fat composition over time by means of a rheometer. After one-day storage, the hardness by the rheometer was 10 g/cm$^2$ and the evaluation was excellent (◎). After one-week storage, the hardness was 40 g/cm$^2$ and the evaluation was excellent (◎). After three-week storage, the hardness was 70 g/cm$^2$ and the evaluation was good (○).

Example 3

According to the same manner as that in Example 1, a fat composition was obtained except that the amount of the extremely hydrogenated oil of high erucic acid rapeseed oil to be incorporated into the regular sunflower oil was changed from 0.2% to 3.0%, followed by allowing the composition to keep in a refrigerator at −20° C. and measuring the hardness of the fat composition over time by means of a rheometer. After one-day storage, the hardness via the rheometer was 8 g/cm$^2$ and the evaluation was excellent (◎) After one-week storage, the hardness was 30 g/cm$^2$ and the evaluation was excellent (◎). After three-week storage, the hardness was 50 g/cm$^2$ and the evaluation was excellent (◎).

Example 4

According to the same manner as that in Example 1, a fat composition was obtained except that the amount of the extremely hydrogenated oil of high erucic acid rapeseed oil to be incorporated into the regular sunflower oil was changed from 0.2% to 4.0%, followed by allowing the composition to stand in a refrigerator at −20° C. and measuring the hardness of the fat composition over time by means of a rheometer. After one-day storage, the hardness by the rheometer was 26 g/cm$^2$ and the evaluation was excellent (◉). After one-week storage, the hardness was 60 g/cm$^2$ and the evaluation was good (○). After three-week storage, the hardness was 95 g/cm$^2$ and the evaluation was good (○).

Comparative Example 1

A fat composition was obtained without incorporation of the extremely hydrogenated oil of high erucic acid rapeseed oil into the regular sunflower oil and, according to the same manner as that in Example 1, the composition was allowed to stand in a refrigerator at −20° C., followed by measuring the hardness of the fat composition over time by means of a rheometer. The hardness by the rheometer was 66 g/cm$^2$ and the evaluation was good (○). After one-week storage, the hardness was 120 g/cm$^2$, slightly increased (the evaluation Δ) and the cold resistance was lost. After three-week storage, the hardness was 160 g/cm$^2$, further increased (the evaluation Δ) and the oil did not have cold resistance.

The results of Examples 1 to 4 and Comparative Example 1 are summarized in Table 2.

TABLE 2

| | Fat or fat composition | After 1 day | After 1 week | After 3 weeks |
|---|---|---|---|---|
| Example 1 | Saturated fatty acid triglyceride (0.2%) was blended to regular sunflower oil | ◉ 22 | ○ 60 | ○ 90 |
| Example 2 | Saturated fatty acid triglyceride (0.3%) was blended to regular sunflower oil | ◉ 10 | ◉ 40 | ○ 70 |
| Example 3 | Saturated fatty acid triglyceride (3.0%) was blended to regular sunflower oil | ◉ 8 | ◉ 30 | ◉ 50 |
| Example 4 | Saturated fatty acid triglyceride (4.0%) was blended to regular sunflower oil | ◉ 26 | ○ 60 | ○ 95 |
| Comparative Example 1 | Regular sunflower oil | ○ 66 | Δ 120 | Δ 160 |

Rheometer value (g/cm$^2$) : ×: 200 or more,
Δ: 100 to 200,
○: 50 to 100,
◉: 50 or less Example 5

A fat composition was obtained by incorporating, as tri-saturated fatty acid glycerides, extremely hydrogenated palm oil (iodine value below 1, melting point 59° C.) into a regular sunflower oil, whose proportion of the polyunsaturated fatty acids to all the unsaturated fatty acids was 78%, in the amount of 0.5% and, according to the same manner as that in Example 1, the composition was allowed to stand in a refrigerator at −20° C., followed by measuring the hardness of the fat composition over time by means of a rheometer. As a result, blending of the extremely hydrogenated palm oil led to the hardness of 20 g/cm$^2$ of the composition even when it was stored for 3 weeks, with the evaluation being excellent (◉). In other words, the cold resistance was significantly improved by blending of 0.5% of the extremely hydrogenated palm oil.

Example 6

A fat composition was obtained by incorporating, as tri-saturated fatty acid glycerides, extremely hydrogenated rice bran oil (iodine value below 1, melting point 62° C.) into the regular sunflower oil in the amount of 0.5% and, according to the same manner as that in Example 1, the composition was allowed to stand in a refrigerator at −20° C., followed by measuring the hardness of the fat composition over time by means of a rheometer. As a result, blending of the extremely hydrogenated oil of rice-bran oil led to the hardness of 40 g/cm$^2$ of the composition even when it was stored for 3 weeks, with the evaluation being excellent (◉).

Comparative Example 2

A fat composition was obtained by incorporating, as tri-saturated fatty acid glycerides, palm stearin (iodine value 43, melting point 50° C., tri-saturated fatty acid glyceride content 18%) into a regular sunflower oil, whose proportion of the polyunsaturated fatty acids to all the unsaturated fatty acids was 78%, in the amount of 0.5% and, according to the same manner as that in Example 1, the composition was allowed to stand in a refrigerator at −20° C., followed by measuring the hardness of the fat composition over time by means of a rheometer. As a result, the hardness of the composition was already increased to 300 g/cm$^2$ during one-week storage and the cold resistance was not improved even by blending palm stearin.

Comparative Example 3

A fat composition was obtained by incorporating monoglyceride behenate (Poem B-100 manufactured by Riken Vitamin Co., Ltd.) instead of tri-saturated fatty acid glycerides was incorporated into the regular sunflower oil in the amount of 0.5% and, according to the same manner as that in Example 1, the composition was allowed to stand in a refrigerator at −20° C. and the hardness of the fat composition was measured over time by means of a rheometer. As a result, the hardness of the composition was already increased to 260 g/cm$^2$ during one-week storage and the cold resistance was not improved even by blending of monoglyceride behenate.

Comparative Example 4

A fat composition was obtained by incorporating acetylated sucrose fatty acid ester (DK Ester F-A10E manufactured by DAI-ICHI KOGYO SEIYAKU Co., Ltd.) instead of tri-saturated fatty acid glycerides into the regular sunflower oil in the amount of 0.5% and, according to the same manner as that in Example 1, the composition was allowed to stand in a refrigerator at −20° C. and the hardness of the fat composition was measured over time by means of a rheometer. As a result, the hardness of the composition was already increased to 300 g/cm$^2$ during one-week storage and the cold resistance was not improved even by blending of acetylated sucrose fatty acid ester.

Comparative Example 5

A fat composition was obtained by incorporating sucrose erucic acid ester (ER-290 manufactured by Mitsubishi Chemical Foods Co., Ltd.) into the regular sunflower oil in the amount of 0.5% and, according to the same manner as that in Example 1, the composition was allowed to stand in a refrigerator at −20° C. and the hardness of the fat composition was measured over time by means of a rheometer.

As a result, the hardness of the composition was already increased to 200 g/cm² during one-week storage and the cold resistance was not improved even by blending of sucrose erucic acid ester.

The results of Examples 5 and 6 as well as Comparative Examples 2 to 5 are summarized in Table 3.

TABLE 3

| | Fat composition | 1 week | 3 weeks |
|---|---|---|---|
| Example 5 | Extremely hydrogenated palm oil (0.5%) was blended to regular sunflower | ◉ 16 | ◉ 20 |
| Example 6 | Extremely hydrogenated rice-bran oil (0.5%) was blended to regular sunflower oil | ◉ 20 | ◉ 40 |
| Comparative Example 2 | Palm stearin (0.5%) was blended to regular sunflower oil | × 300 | × 600 |
| Comparative Example 3 | Monoglyceride behenate (0.5%) was blended to regular sunflower oil | × 260 | × 400 |
| Comparative Example 4 | Acetylated sucrose fatty ester (0.5%) was blended to regular sunflower oil | × 300 | × 470 |
| Comparative Example 5 | Sucrose erucic acid ester (0.5%) was blended to regular sunflower oil | Δ 200 | × 280 |

Rheometer value (g/cm2): ×: 200 or more,
Δ: 100 to 200,
○: 50 to 100,
◉: 50 or less

Example 7

A fat composition was obtained by incorporating an extremely hydrogenated palm oil (iodine value below 1, melting point 59° C.) oil as tri-saturated fatty acid glycerides into soybean oil, whose proportion of the polyunsaturated fatty acids to all the unsaturated fatty acids was 72%, in the amount of 0.5% and, according to the same manner as that in Example 1, the composition was allowed to stand in a refrigerator at −20° C. and the hardness of the fat composition was measured over time by means of a rheometer. As a result, blending of the extremely hydrogenated oil of palm oil led to the hardness of 20 g/cm² of the composition even during one-week storage, with the evaluation being good (○). In other words, the cold resistance was significantly improved by blending 0.5% of the extremely hydrogenated palm oil.

Example 8

Use Example, Oil-Based Sauce

A cold resistant fat composition was obtained by incorporating an extremely hydrogenated palm oil (iodine value below 1, melting point 59° C.) as tri-saturated fatty acid glycerides into a regular sunflower oil, whose proportion of the polyunsaturated fatty acids to all the unsaturated fatty acids was 78%, in the amount of 0.5%, melting the mixture at 65° C. and then cooling the mixture. To 55 parts of this cold resistant fat composition were added 20 parts of a skim milk powder, 25 parts of sugar and 0.5 part of lecithin, and the resulting mixture was blended with heating at 65° C. for 30 minutes. This mixture was applied to rolls, followed by conching and finishing according to a conventional chocolate production to obtain an oil-based sauce. According to the same manner as that in Example 1, the sauce was allowed to stand in a refrigerator at −20° C. and, after two weeks, the hardness of the oil-based sauce was determined by a rheometer. The hardness was 70 g/cm². Separately, the oil-based sauce was filled as a center material of a cup ice cream and was stored in a refrigerator. After one week, the ice cream was taken out and tasted. It was soft and readily penetrable to a spoon. Meltability in the mouth and taste was good. This oil-based sauce remarkably matched with ice cream.

Comparative Example 6

Use Example, Oil-Based Sauce

According to the same manner as that in Example 8, an oil-based sauce was obtained except that 55 parts of the regular sunflower oil was used instead of 55 parts of the cold-resistant fat composition. The hardness of the oil-based sauce after two weeks was 250 g/cm². The cup ice cream in which the oil-based sauce was filled as a center material was tasted under the same conditions as in Example 8. As a result, it was poorly penetrable to a spoon.

INDUSTRIAL APPLICABILITY

According to the present invention, it is possible to provide a fat composition of excellent cold-resistance by inhibiting crystal growth of the fat even for long-term storage at a low temperature (in a refrigeration or freezing temperature range), a process of producing the fat composition, and an oil-based food containing the cold-resistant fat composition as a main component of the fat component(s).

What is claimed is:

1. A cold-resistant fat composition comprising 0.15 to 4.5% by weight of tri-saturated fatty acid glycerides based on a fat which is in a liquid state at room temperature and has 60% or more of the proportion of polyunsaturated fatty acids in all the unsaturated fatty acids therein, constituent fatty acids of said tri-saturated fatty acid glycerides being myristic acid, palmitic acid, stearic acid, arachic acid, behenic acid and lignoceric acid.

2. A process for producing a cold-resistant fat composition which comprises incorporating tri-saturated fatty acid glycerides into a fat which is in a liquid state at room temperature and has 60% or more of the proportion of polyunsaturated fatty acids in all the unsaturated fatty acids therein in an amount of 0.15 to 4.5% by weight based on the fat, constituent fatty acids of said tri-saturated fatty acid glycerides being myristic acid, palmitic acid, stearic acid, arachic acid, behenic acid and lignoceric acid.

3. An oil-based food comprising as a main component of its fat component(s) the cold-resistant fat composition according to claim 1.

* * * * *